US012717749B2

(12) United States Patent
Jeong

(10) Patent No.: US 12,717,749 B2
(45) Date of Patent: Aug. 25, 2026

(54) SYSTEMS, METHODS, AND APPARATUS FOR PROCESSING IN MEMORY USING DIE-TO-DIE INTERCONNECTS

(71) Applicant: Samsung Electronics Co., Ltd., Suwon-si (KR)

(72) Inventor: Hyoun Kwon Jeong, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 24 days.

(21) Appl. No.: 18/818,543

(22) Filed: Aug. 28, 2024

(65) Prior Publication Data

US 2025/0190391 A1 Jun. 12, 2025

Related U.S. Application Data

(60) Provisional application No. 63/608,823, filed on Dec. 11, 2023.

(51) Int. Cl.
*G06F 13/42* (2006.01)
*G06F 15/173* (2006.01)

(52) U.S. Cl.
CPC .... *G06F 13/4282* (2013.01); *G06F 15/17306* (2013.01)

(58) Field of Classification Search
CPC ....................... G06F 13/4282; G06F 15/17306
See application file for complete search history.

(56) References Cited

U.S. PATENT DOCUMENTS 10,108,364 B2 * 10/2018 Maiolani ............... G06F 3/0673
2004/0148482 A1 * 7/2004 Grundy ............... G06F 13/4256 711/104
2019/0013051 A1 * 1/2019 Jayasena ................ G06F 12/02
2021/0124711 A1 * 4/2021 Ansari .................. G06F 21/575
2022/0254390 A1 * 8/2022 Gans ...................... H03K 19/20
2023/0080480 A1 * 3/2023 Kayi ...................... G06N 3/084 718/104
2023/0333778 A1 * 10/2023 Giduturi ............... G06F 3/0679

* cited by examiner

*Primary Examiner* — Henry Tsai
*Assistant Examiner* — Harry Z Wang
(74) *Attorney, Agent, or Firm* — Renaissance IP Law Group LLP

(57) ABSTRACT

An apparatus may include a first device including at least one first die including a first interface, a memory media configured to store first information received using the first interface, and a compute element configured to perform, using the first information, a compute operation, and a second device including at least one second die including a second interface configured to receive second information, and a third interface coupled to the first interface and configured to send the first information, wherein the first information may be based on the second information. The at least one second die may include a second memory media configured to store at least a portion of the second information, and a second compute element configured to perform, using the at least a portion of the second information, a second compute operation.

20 Claims, 12 Drawing Sheets

SYSTEMS, METHODS, AND APPARATUS FOR PROCESSING IN MEMORY USING DIE-TO-DIE INTERCONNECTS

REFERENCE TO RELATED APPLICATION

This application claims priority to, and the benefit of, U.S. Provisional Patent Application Ser. No. 63/608,823 filed Dec. 11, 2023 which is incorporated by reference.

TECHNICAL FIELD

This disclosure relates generally to memory systems, and more specifically to systems, methods, and apparatus for processing in memory using die-to-die (D2D) interconnects.

BACKGROUND

Interconnects may be used to transfer data between components in computing systems. For example, an interconnect may be used to transfer data between a processing unit and one or more peripheral components such as a graphics device, a storage device, a network interface, and/or the like. A die-to-die interconnect may be used to transfer data between integrated circuit dies, which may also be referred to as chips. For example, a die-to-die interconnect may be used to transfer data between two integrated circuit dies that may be located in the same package.

The above information disclosed in this Background section is only for enhancement of understanding of the background of the inventive principles and therefore it may contain information that does not constitute prior art.

SUMMARY

An apparatus may include a first device including at least one first die including a first interface, a memory media configured to store first information received using the first interface, and a compute element configured to perform, using the first information, a compute operation, and a second device including at least one second die including a second interface configured to receive second information, and a third interface coupled to the first interface and configured to send the first information, wherein the first information may be based on the second information. The compute operation may generate third information, and the at least one first die may include a fourth interface configured to send the third information. The memory media may be a first memory media, the compute element may be a first compute element, the compute operation may be a first compute operation, and the at least one second die may include a second memory media configured to store at least a portion of the second information, and a second compute element configured to perform, using the at least a portion of the second information, a second compute operation. The second compute operation may generate at least a portion of the first information. The first information may include at least a portion of the second information. The second information may include input data for the compute operation. The second information may include command information for the compute operation. The compute operation may generate third information, the at least one first die may include a fourth interface configured to send the third information, and the at least one second die may include a fifth interface configured to receive the third information. The memory media may be a first memory media, the compute element may be a first compute element, the compute operation may be a first compute operation to generate third information, the at least one first die may include a fourth interface configured to send the third information, and the apparatus may include a third device including at least one third die including a fifth interface configured to receive the third information, a second memory media configured to store at least a portion of the third information, and a second compute element configured to perform, using the at least a portion of the third information, a second compute operation.

An apparatus may include a die including a first interface, a second interface, a third interface, and at least one control circuit configured to receive, using the first interface, first information for a compute operation, receive, using the second interface, second information for the compute operation, control the compute operation, wherein the compute operation may be performed, using the first information and the second information, by at least one compute element to generate third information, and send, using the third interface, the third information. The first interface may include a first die interface, the second interface may include a memory interface, and the third interface may include a second die interface. The at least one control circuit may be configured to receive, using the first interface, at least a portion of the second information, and send, using the second interface, the at least a portion of the second information. The at least one control circuit may be configured to receive, using the first interface, command information, and perform, based on the command information, the compute operation. The at least one control circuit may be configured to receive, using the first interface, command information, and send, using the third interface, at least a portion of the command information. The at least one control circuit may include a memory controller. The at least one control circuit may be configured to access the compute element using the second interface. The die may include at least a portion of the compute element.

A method may include receiving, at a first device, using a first die interface, information, wherein the first device may include a first memory media and a first compute element, storing, in the first memory media, at least a first portion of the information, sending, from the first device, using a second die interface, to a second device, at least a second portion of the information, wherein the second device may include a second memory media and a second compute element, storing, in the second memory media, the second portion of the information, performing, using the first portion of the information and the first compute element, a first compute operation, and performing, using the second portion of the information and the second compute element, a second compute operation. The information may be first information, the method may further include sending, using the second die interface, from first device to second device, second information, wherein the second compute operation may be performed using the second information. The first compute operation may include a first portion of a matrix operation, and the second compute operation may include a second portion of the matrix operation.

An apparatus may include a die including a first interface, a second interface, and at least one control circuit configured to receive, using the first interface, first information for a compute operation, generate, based on the first information, second information for the compute operation, and send, using the second interface, the second information and at least a portion of the first information. The second information may include command information. The at least a portion of the first information may include first input data for the compute operation, and the second information may include second input data for the compute operation.

BRIEF DESCRIPTION OF THE DRAWINGS

The figures are not necessarily drawn to scale. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
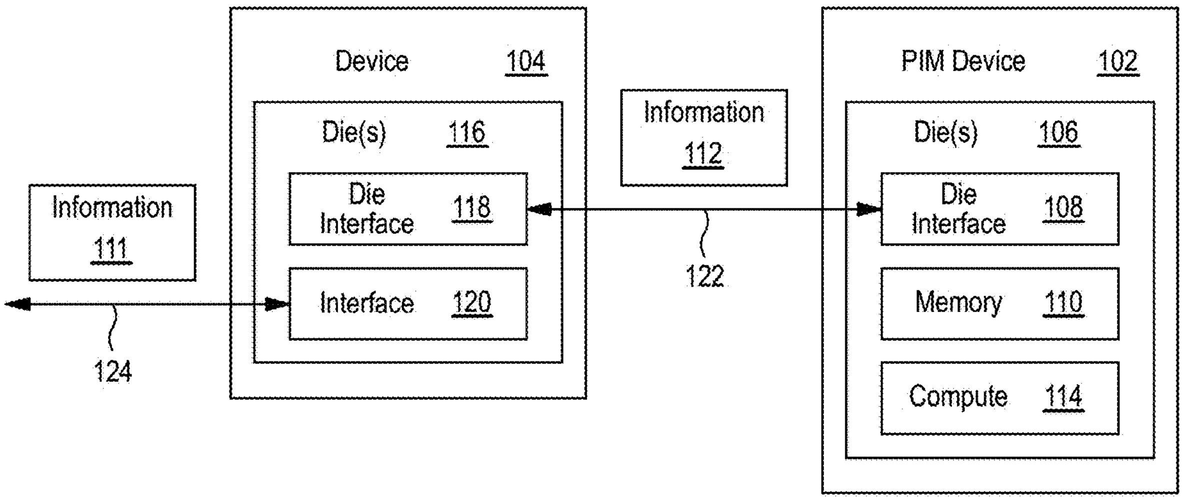
FIG. 1 illustrates a diagram of an embodiment of an apparatus including a processing in memory device configured to communicate using another device and a die interconnect in accordance with example embodiments of the disclosure.

A processing unit (e.g., a central processing unit (CPU), graphics processing unit (GPU), neural processing unit (NPU), tensor processing unit (TPU), data processing unit (DPU) and/or the like) may access memory using one or more memory interfaces such as a double data rate (DDR) interface, a high bandwidth memory (HBM) interface, and/or the like. For example, a GPU may be implemented as a system-on-chip (SoC) that may use an HBM interface to access a memory device implemented with stacked memory dies (e.g., an HBM device). In some embodiments, a memory device such as an HBM device may include compute functionality at a memory die and/or at another die stacked with, or located near, a memory die which may be referred to as a processing in memory (PIM) and/or a processing near memory (PNM) configuration. For convenience, processing in memory and/or processing near memory may be referred to individually and/or collectively as processing in memory or PIM.

To increase the amount of memory (and/or PIM) available to the GPU, multiple HBM devices may be connected to the GPU SoC using multiple HBM interfaces (which may also be referred to as using multiple memory channels). A memory interface may be fabricated at or near a periphery (e.g., an edge) of an SoC and may consume a relatively large area on the SoC. Thus, in some embodiments, and depending on the implementation details, the ability to increase the amount of memory and/or PIM available to the GPU (which may be referred to as scaling) may be limited by the area and/or size of edges of an SoC which, in turn, may be limited by factors such as cost, yield, power, performance, and/or the like.

Some aspects of the disclosure relate to one or more PIM devices that may communicate (e.g., with a host such as a processing unit or other user) using at least one other PIM device, memory device, gateway device, accelerator device, and/or the like. For example, a first PIM device may be connected to a host using a first communication link. A second PIM device may communicate with the first PIM device using a second communication link. Thus, in some embodiments, and depending on the implementation details, the second PIM device may communicate, directly and/or indirectly, with the host through the first PIM device. For example, the first PIM device may receive, using the first communication link, first information from the host. The first PIM device may send at least a portion of the first information to the second PIM device using the second communication link.

Additionally, or alternatively, the first PIM device may send second information to the second PIM device using the second communication link. The second information may be generated by the first PIM device, for example, by modifying the first information, by appending more information to the first information, by performing an operation (e.g., a computation) that may be based, for example, on the first information and/or other information (e.g., to generate a result), and/or the like.

In some embodiments, the first PIM device and/or second PIM device may communicate with one or more additional PIM devices, for example, using one or more additional communication links. One or more PIM devices, memory devices, gateway devices, accelerator devices, communication links, and/or the like, may be arranged in any configuration, for example, in one or more network topologies such as one or more of a chain, bus, mesh, tree, ring, star, and/or the like, and/or multiples and/or combinations (e.g., hybrid combinations) thereof. In some embodiments, and depending on the implementation details, a collection of one or more PIM devices, memory devices, gateway devices, and/or the like, connected with one or more communication links may be referred to as a cluster (e.g., a compute cluster).

In some embodiments, one or more communication links may be implemented with one or more die-to-die interconnects (which may also be referred to as die interconnects or D2D interconnects). Die interconnects may be used to transfer data between integrated circuit (IC) dies (which may also be referred to as chips or chiplets). Die interconnects may enable multiple dies to be assembled in a package, for example, as a system in package (SIP), multi-chip module (MCM), and/or the like. Examples of die interconnects may include Universal Chiplet Interconnect Express (UCIe). Advanced Interface Bus (AIB), Bunch of Wires (BOW), and/or the like.

Some additional aspects of the disclosure relate to dies that may be used to implement schemes in which one or more PIM devices may communicate using at least one other PIM device, memory device, gateway device, accelerator device, and/or the like. As a first example, in some embodiments, a die may include functionality to enable a PIM device, a memory device, an accelerator device, and/or the like to operate as, or as part of, a node (e.g., a compute node (which may be implemented as a PIM node, an accelerator node, and/or the like), a memory node, and/or the like) of a cluster, a network of PIM and/or memory devices, and/or the like. In such embodiments, the die may include a first interface (e.g., a memory interface to access one or more memory devices such as one or more HBM dies, PIM dies, and/or the like) and one or more additional interfaces (e.g., one or more die interfaces to communicate with one or more other dies). In such embodiments, the die may be referred to as a node die, a compute node die (e.g., if the node includes compute functionality), a compute element die (e.g., if the node includes compute functionality), a memory node die (e.g., if the node includes memory), a PIM node die (e.g., if the node includes PIM functionality) and/or the like. In embodiments in which the die may be configured to operate as a node of a chain, the die may be referred to as a chain die, a chain element die, and/or a PIM chain element (PCE) die (e.g., if the node includes PIM functionality). In some embodiments, a node die may be configured, and/or referred to, as a base die (e.g., with one or more memory dies such as HBM dies stacked on the node die), a logic die, a buffer die, and/or a compute die (e.g., with compute functionality implemented at the node die). In some embodiments, a node die may be connected to one or more other dies at the node using one or more interposers, substrates (e.g., organic substrates), semiconductor bridges (e.g., silicon bridges), through vias such as through silicon vias (TSVs) and/or the like.

As a second example, in some embodiments, a die may include functionality to operate as, or as part of, a gateway device for one or more PIM devices, memory devices, and/or the like. In such embodiments, the die may include a first interface and one or more additional interfaces. The first interface may be implemented, for example, with a communication interface that may be suitable for communication between packages (e.g., between a first apparatus within a package and a second apparatus outside the package) such as Peripheral Component Interconnect Express (PCIe), Compute Express Link (CXL), and/or the like. The first interface may be used, for example, to enable the gateway device to communicate with a host such as a processing unit or other user. The one or more additional interfaces may be implemented, for example, with a die interface that may be suitable for communication between dies within a package (e.g., UCIe, AIB, BOW, and/or the like). The one or more additional interfaces may be used, for example, to enable the gateway device to communicate with one or more devices such as PIM devices, memory devices, accelerator devices, other gateway devices, and/or the like. In such embodiments, the die may be referred to as a gateway die or a gateway node die. In embodiments in which the gateway die may be configured as part of a chain (e.g., as a gateway for a chain), the die may be referred to as a chain gateway die, and/or a PIM chain gateway (PCG) die (e.g., if the chain may include one or more nodes having PIM functionality).

In some embodiments, a gateway die may include functionality to implement a compute scheme in which one or more compute operations may be performed by one or more PIM devices (e.g., at one or more compute nodes) connected to the gateway die (e.g., using one or more die interfaces). For example, a gateway die may include gateway logic configured to receive (e.g., from a host such as a processing unit or other user through a die interface) input information for one or more compute operations (e.g., input data, one or more models and/or parameters for models such as weights, activation functions, and/or the like, commands for one or more compute operations, and/or the like). In some embodiments, the gateway logic may generate additional information the for one or more compute operations (e.g., one or more command packets) based on the input information. The gateway logic may be configured to send some or all of the input information, and/or the additional information it may generate, to one or more PIM devices, memory devices, and/or the like (e.g., to one or more PIM devices and/or memory devices configured as a compute cluster). In some embodiments, at least a portion of the gateway functionality may be included a compute node die (e.g., a PIM node die), a memory node die, an accelerator node die, a host such as a processing unit or other user, and/or the like.

Some additional aspects of the disclosure relate to computation schemes that may be implemented, for example, using one or more PIM devices that may communicate using at least one other PIM device, memory device, gateway device, accelerator device, and/or the like. For example, in some embodiments, a gateway device may distribute information for a compute operation (e.g., a model and/or information for a model such as weights for a model) to one or more compute nodes. The one or more compute nodes may be connected to the gateway device in a chain or other configuration. In some embodiments, the one or more compute nodes may be connected in a manner that may form a loop (e.g., a ring, a closed chain, and/or the like) with the gateway device. For some compute operations, the gateway device may send a complete copy of the information for the compute operation to one or more of the compute nodes (e.g., a complete copy to each compute node). For some other compute operations, the gateway device may send a portion of the information to one or more of the compute nodes (e.g., a different portion of the information to each compute node). Depending on the connection configuration of the one or more PIM devices, some or all of the information sent to one compute node may be transferred through one or more other compute nodes and/or memory nodes.

The one or more compute nodes may perform some or all of the compute operation using information located at the respective compute node (e.g., each of the compute nodes may perform a portion of the compute operation). For example, different portions of a first operand (e.g., portions of a matrix) may be distributed to different compute nodes, and one or more compute nodes having a portion of the operand may perform a portion of the compute operation (e.g., a portion of a matrix multiplication) using a second operand (e.g., a scalar, a vector, a matrix, and/or the like) that may be distributed to the different compute nodes.

Additionally, or alternatively, different second operands (or different portions of a second operand) may be distributed to different compute nodes which may use the second operands, or portions of a second operand, to perform a portion of the compute operation (e.g., a portion of a matrix multiplication). In some embodiments, an output from one portion of a compute operation (e.g., a result) performed by one compute node may by be sent to, and/or used as an input (e.g., an operand) by, another compute node.

Some additional aspects of the disclosure relate to structures and/or methods for sending data, commands, and/or the like, to and/or from one or more PIM devices that may communicate using at least one other PIM device, memory device, gateway device, and/or the like. For example, in some embodiments, a gateway device may send a command packet and/or input data for a compute operation to at least one compute node. Depending on the connection configuration of the one or more PIM devices, the command packet and/or input data may flow through one or more additional compute nodes. A node receiving the command packet and/or input data may use the command packet and/or input data to perform a compute operation, or a portion of a compute operation, and send the command packet, input data, a result of a compute operation (or portion thereof), and/or a completion, to another compute node, which may use the command packet, input data, and/or result, to perform another compute operation (or portion thereof), and forward the command packet, input data, a result of its operation, and/or another completion, to yet another compute node, for example, in a pipeline configuration. Depending on the connection configuration (e.g., if one or more of the compute nodes are arranged in a loop such as a ring or closed chain), a compute node may send a result (e.g., a final result) and/or a completion (e.g., a final completion) to the gateway device, for example, through a communication link between the compute node and the gateway device. Additionally, or alternatively, a result (e.g., a final result) and/or a completion (e.g., a final completion) may be sent to the gateway device back through one or more compute nodes through which the command packet and/or input data may have been sent.

In some embodiments, and depending on the implementation details, aspects of the disclosure may enable one or more compute nodes to perform computations using relatively large amounts of data, compute cycles, and/or the like, while reducing data movement between devices. For example, one or more compute nodes implemented with HBM PIM functionality may exploit relatively large internal memory bandwidth and/or compute functionality within a compute node to perform a portion of a compute operation (e.g., a portion of a matrix multiplication and/or reduction) involving relatively large amounts of data, compute cycles, and/or the like. However, the compute node may send a relatively small amount of information such as one or more command packets, completions, relatively small operands (e.g., embedding vectors, activation vectors, compute results, and/or the like), to another device (e.g., a compute node, gateway device, and/or the like). Moreover, the one or more compute nodes, gateway devices, and/or the like, may use interfaces (e.g., die interfaces) that may consume relatively small amounts of die area, edge length, and/or the like, of a host such as a GPU SoC. Thus, depending on the implementation details, more memory and/or compute functionality (e.g., PIM compute clusters) may be connected to a host, thereby increasing the memory, PIM functionality, and/or the like, available to the host. Depending on the implementation details, this may reduce latency, power consumption, cost, and/or the like, which may thereby improve scalability.

This disclosure encompasses numerous aspects relating to interconnects, processing in memory schemes, and/or the like. The aspects disclosed herein may have independent utility and may be embodied individually, and not every embodiment may utilize every aspect. Moreover, the aspects may also be embodied in various combinations, some of which may amplify some benefits of the individual aspects in a synergistic manner.

For purposes of illustration, some embodiments may be described in the context of some example implementation details such as one or more PIM devices that may communicate using at least one other PIM device, memory device, gateway device, and/or the like. The aspects disclosed herein, however, are not limited to these or any other implementation details.

FIG. 1 illustrates a diagram of an embodiment of an apparatus including a PIM device configured to communicate using another device and a die interconnect in accordance with example embodiments of the disclosure. The embodiment illustrated in FIG. 1 may include a first device (which in this embodiment may be implemented with a PIM device) 102 and a second device 104. The PIM device 102 may include one or more dies 106 that may implement a first interface (which in this embodiment may be implemented with a first die interface) 108, a memory media 110 configured to store first information 112 received using the first die interface 108, and a compute element 114 configured to perform a compute operation using the first information 112. In some embodiments, the PIM device 102 may be used to implement a compute node (e.g., a PIM node) as described herein.

The memory media 110 may be implemented with any type of volatile and/or nonvolatile memory media including dynamic random access memory (DRAM), static random access memory (SRAM), flash memory including not-AND (NAND) flash memory, persistent memory such as cross-gridded nonvolatile memory, memory with bulk resistance change, phase change memory (PCM), and/or the like, or any combination thereof. The memory media 110 may be accessed using any type of memory interface such as a DDR interface of any generation (e.g., DDR, DDR2, DDR3, DDR4, DDR5, and/or the like), an HBM interface of any generation (e.g., HBM, HBM2, HBM3, HBM4, and/or the like), Open Memory Interface (OMI), and/or the like.

The first die interface 108 may be implemented with any type of die interface including UCIe, AIB, BOW, Open High Bandwidth Interface (OpenHBI), and/or the like.

Examples of compute elements that may be used to implement the compute element 114 may include complex programmable logic devices (CPLDs), field programmable gate arrays (FPGAs), application specific integrated circuits (ASICs), compute circuits including combinational logic, sequential logic, timers, counters, registers, state machines, and/or the like, embedded processors, microcontrollers, CPUs such as complex instruction set computer (CISC) processors (e.g., x86 processors) and/or reduced instruction set computer (RISC) processors such as ARM processors, GPUs, NPUs, TPUs, DPUs, and/or the like, that may execute instructions stored in any type of memory and/or implement any type of execution environment such as a container, a virtual machine, an operating system such as Linux, an Extended Berkeley Packet Filter (eBPF) environment, and/or the like, or a combination thereof.

The compute element 114 may implement any type of compute functionality, including, for example, matrix multiplication (e.g., general matrix multiplication (GEMM), vector multiplication (e.g., general matrix vector (GEMV)), a math engine such as SoftMax, Gaussian error linear unit (GELU), rectified linear unit (ReLU), sigmoid, and/or the like), and/or any other functionality.

The first die interface 108, memory media 110, and/or compute element 114 may be implemented in any combination on any number of dies 106. For example, in some embodiments, each of the first die interface 108, memory media 110, and compute element 114 may be implemented on separate dies. In other embodiments, all of the first die interface 108, memory media 110, and compute element 114 may be implemented on one die. In another example embodiment, the components may be arranged in a stacked configuration with the first die interface 108 fabricated on a base die, the compute element 114 fabricated as part of a PIM die (e.g., a die including memory such as DRAM and one or more compute elements fabricated on the same die which may be referred to as a PIM-DRAM die) stacked on the base die, and the memory media 110 fabricated on a memory die (e.g., a DRAM die) stacked on the PIM die.

The second die interface 118 may be implemented with any type of die interface including UCIe, AIB, BOW, OpenHBI, and/or the like, which may be compatible with the first die interface 108. In other embodiments, however, the first interface 108 and second interface 118 may be implemented with other types of communication interface (e.g., a package interface) such as PCIe, CXL, and/or the like.

The second device 104 may be implemented with one or more of a PIM device, a memory device, a gateway device, an accelerator device, and/or the like. The second device 104 may include one or more dies 116 having a second interface (which in this embodiment may be implemented with a second die interface) 118 and a third interface 120. The second die interface 118 may be connected to the first die interface 108 at the PIM device 102 using a first die interconnect having a first communication link 122. (In some embodiments, and depending on the implementation details and/or context, the first die interface 108, the second die interface 118, and/or the first communication link 122 may be referred to collectively and/or individually as a first die interconnect.)

The third interface 120 may be connected to another device such as a PIM device, a memory device, a gateway device, an accelerator device, and/or the like, using a second communication link 124. Additionally, or alternatively, the third interface 120 may be connected to a host such as a processing unit or other user using the second communication link 124. The second device 104 may be configured to receive second information 111 using the third interface 120 and send the first information 112 to the PIM device 102 using the second die interface 118. The first information 112 may be based, for example, on the second information 111.

In an embodiment in which the third interface 120 is connected to another device such as a PIM device, a memory device, a gateway device, an accelerator device, and/or the like, or a host such as a processing unit or other user that may be implemented with a die, an SoC, and/or the like, the second communication link 124 may be implemented, for example, with a die interface such as UCIe, AIB, BOW, and/or the like. In an embodiment in which the third interface 120 is connected to a host such as a processing unit or other user in a different package (e.g., a die in another package, another assembly such as a circuit board, card, chassis, rack, server, datacenter, and/or the like) the second communication link 124 may be implemented, for example, with a communication interface (e.g., a package interface) such as PCIe, CXL, and/or the like.

The first information 112 may include command information for the compute operation. For example, in an embodiment in which the second device 104 is implemented at least in part with a gateway device (e.g., a gateway node), the second device 104 may generate at least a portion of first information 112 as a command packet based on a command received in second information 112 from a host. Additionally, or alternatively, in an embodiment in which the second device 104 is implemented at least in part with another compute node (e.g., a PIM node), the first information 112 may include a command packet that the second device 104 received from a gateway node or another compute node.

Additionally, or alternatively, the first information 112 may include input data (e.g., an operand) for the compute operation. For example, in an embodiment in which the second device 104 is implemented at least in part with a gateway device (e.g., a gateway node), the first information 112 may include a matrix, a vector, a scalar, or a portion thereof that the that the second device 104 received from a host. As another example, in an embodiment in which the second device 104 is implemented at least in part with another compute node (e.g., a PIM node), the first information 112 may include a result from a compute operation performed by the other compute node.

A host may refer to any user and may be implemented with any hardware and/or software component or combination of components including one or more of a server, a storage node, a compute node, a processing unit (e.g., a CPU, GPU, NPU, TPU, DPU, and/or the like), a workstation, a personal computer, a tablet computer, a smartphone, an operating system, an application (e.g., a software application), a driver, a process, a service, a virtual machine (VM), a VM manager, and/or the like, or multiples and/or combinations thereof.

Although the embodiment illustrated in FIG. 1 is not limited to any specific application, configuration, and/or the like, in some embodiments it may be used to implement a compute cluster in which the second device 104 may be configured as a gateway (e.g., a gateway node) and connected to a host (e.g., a GPU, NPU, or other processing unit fabricated on a die such as an SoC) using the second communication link 124. In such a configuration, the second device 104 may be configured (e.g., using logic such as one or more controllers) to receive the second information 112, which may include one or more operands such as all or part of a matrix, all or part of a vector, and/or the like, from the host and send at least a portion of the second information 112 as first information 112 to the PIM device 102 which may store the first information 112 in the first memory media 110. The second device 104 may also be configured to receive a first command (e.g., an execute command) from the host and send a corresponding second command (e.g., using a command packet) to the PIM device 102 which may execute a compute operation based on the second command.

For example, the second command may cause the PIM device 102 to perform all or part of a matrix multiply operation using a matrix or portion thereof stored in the first memory media 110 as a first operand and a matrix or vector or portion thereof received from the second device 104 as a second operand. In some embodiments, the PIM device 102 may send a result of the compute operation to the host back through the second device 104. In some other embodiments, the one or more dies 106 at the PIM device 102 may include another die interface through which the PIM device 102 may send the result to another device (e.g., another PIM device) arranged in a chain, tree, ring, and/or the like, with the PIM device 102. Additionally, or alternatively, the PIM device 102 may use an additional die interface to send the result back to the second device 104 (e.g., through another die interface at the second device 104), and/or to the host (e.g., through another interface at the host), and/or the like. In some embodiments, in addition to being configured to operate as a gateway, the second device 104 may also include PIM functionality and may be configured to perform all or a portion of a compute operation in a manner similar to the PIM device 102.

In some embodiments, and depending on the implementation details, the memory media 110, and compute element 114 may communicate using a memory interface (e.g., an HBM interface) that is internal to the PIM device 102 and that may have a relatively large bandwidth, area footprint, die edge length, and/or the like, on one or more dies 106, whereas the PIM device 102 may communicate with the second device 104 and/or a host using one or more die interfaces 108, 118, 120, and/or the like, that may occupy a relatively smaller amount of die area, die edge length, and/or the like. Thus, the PIM device 102 may exploit the relatively large internal memory bandwidth and/or compute functionality (e.g., as a compute node) to perform a portion of a compute operation (e.g., a portion of a matrix multiplication and/or reduction) involving relatively large amounts of data, compute cycles, and/or the like. However, the PIM device 102 may send and/or receive a relatively small amount of information such as one or more command packets, completions, relatively small operands (e.g., embedding vectors, activation vectors, compute results, and/or the like), to another device (e.g., another PIM device (e.g., configured as another compute node), a gateway device, an accelerator device, a host, and/or the like) using one or more die interfaces 108, 118, 120, and/or the like, that may use interfaces that may consume relatively small amounts of die area, edge length, and/or the like, of a host such as a GPU SoC. Thus, depending on the implementation details, embodiment illustrated in FIG. 1 may enable more memory and/or compute functionality (e.g., PIM compute clusters) to connected to a host, thereby increasing the memory, PIM functionality, and/or the like, available to the host. Depending on the implementation details, this may reduce latency, power consumption, cost, and/or the like, which may thereby improve scalability.

Figure 2:
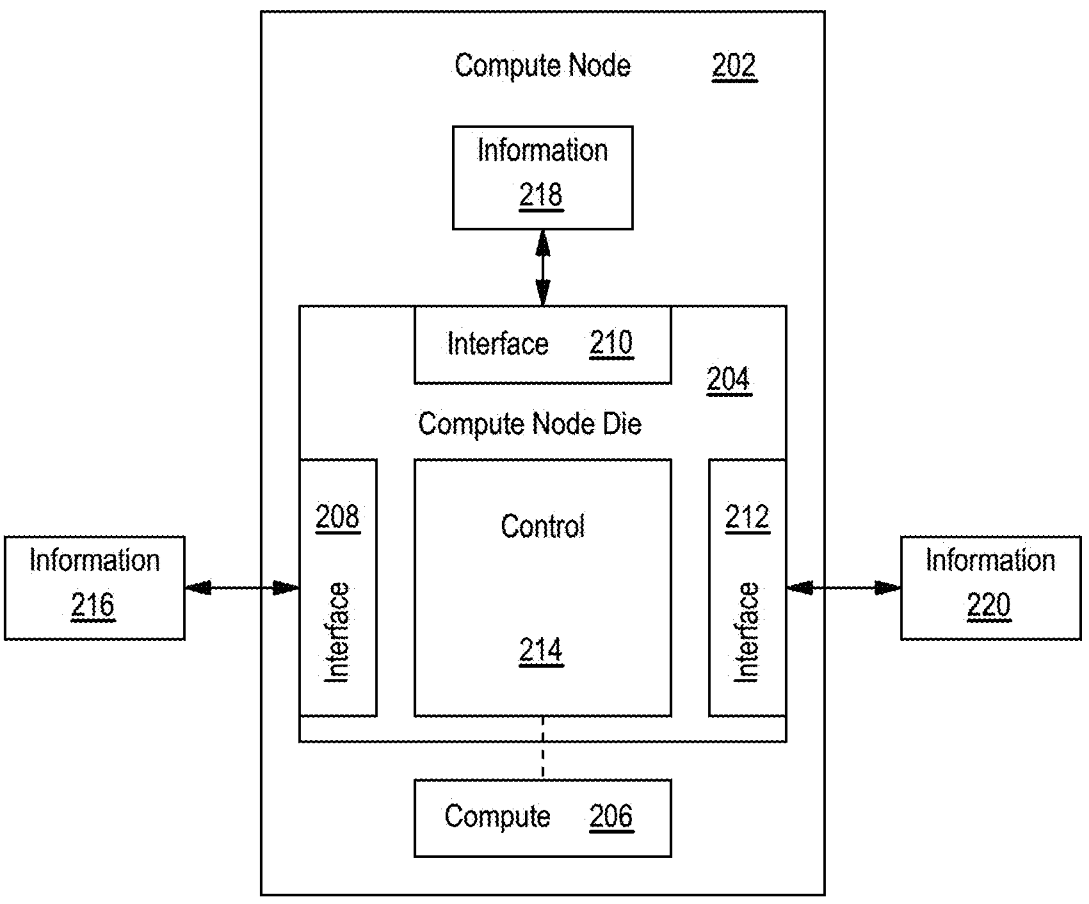
FIG. 2 illustrates a diagram of an embodiment of a compute node having a compute node die in accordance with example embodiments of the disclosure.

FIG. 2 illustrates a diagram of an embodiment of a compute node having a compute node die in accordance with example embodiments of the disclosure. The compute node 202 may include a compute node die 204 and/or one or more compute elements 206. The compute node die 204 may include a first interface 208, a second interface 210, a third interface 212, and/or control logic 214. In some embodiments, the first interface 208 and/or third interface 212 may be implemented, for example, with die interfaces, and the second interface 210 may be implemented with a memory interface. The one or more compute elements 206 may be located anywhere at or near the compute node 202, for example, on one or more dies (e.g., one or more memory dies) connected to the second interface 210, on a separate die, on the compute node die 204, or any combination thereof.

The control logic 214 may control one or more operations of the compute node die 204 and/or compute node 202 including one or more operations, for example, as follows. The compute node 202 and/or compute node die 204 may receive first information 216 for a compute operation and second information 218 for the compute operation using the first interface 208 and the second interface 210, respectively. The first information 216 may be received, for example, as input data from a host, either directly or through a gateway, from another compute node and/or an accelerator (e.g. as a result from another compute operation), from a memory node, and/or the like. The second information 218 may be received, for example, from a memory media (e.g., an HBM die) that may be connected to the second interface 210 (e.g., an HBM interface). The memory media may be located anywhere at or near the compute node 202, for example, on one or more dies connected to the second interface 210, on the compute node die 204, or any combination thereof. For example, in some embodiments, the compute node die 204 may be configured as a base die (e.g., a buffer die, logic die, and/or the like), and the memory and/or one or more compute elements 206 may be stacked on the compute node die 204. As another example, in some embodiments, the compute node die 204 may be located at one location on an interposer, substrate, and/or the like, the memory and/or one or more compute elements 206 may be located at one or more additional locations on the interposer, substrate, and/or the like.

The one or more compute elements 206 may perform the compute operation using the first information 216 and the second information 218. In some embodiments, the compute operation may generate third information 220 (e.g., a result of a compute operation) which the compute node die 204 may send, using the third interface 212, for example, to another node such as a compute node, a memory node, an accelerator node, a gateway node, a host, and/or the like. The one or more compute elements 206, and any of the compute elements disclosed herein, may be implemented, for example, with one or more of the compute elements 114 described above with respect to FIG. 1.

Figure 3:
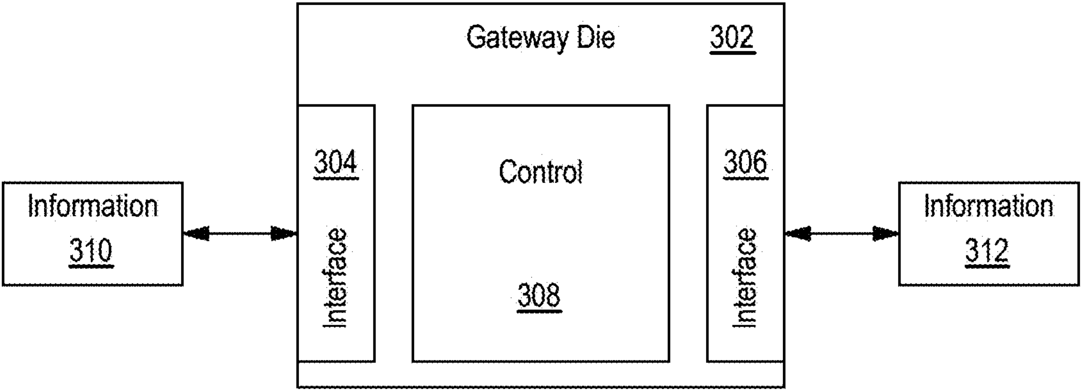
FIG. 3 illustrates a diagram of an embodiment of a gateway die in accordance with example embodiments of the disclosure.

FIG. 3 illustrates a diagram of an embodiment of a gateway die in accordance with example embodiments of the disclosure. The gateway die 302 illustrated in FIG. 3 may include a first interface 304, a second interface 306, and/or control logic 308. The first interface 304 may be implemented, for example, with a die interface that may connect the gateway die 302 to a compute node die and/or compute node located in a common package (e.g., on a common interposer, substrate, and/or the like) with the gateway die 302. The second interface 306 may be implemented with a communication interface that may be suitable for communicating with a host such as a processor (e.g., GPU, NPU, and/or the like) on an SoC.

For example, if a host SoC is located in a different package than the gateway die 302, the second interface 306 may be implemented with an interconnect interface such as PCIe, CXL, Cache Coherent Interconnect for Accelerators (CCIX), UCIe configured with retimers for off-package communications, and/or the like, and/or a network interface such as Ethernet, Transmission Control Protocol/Internet Protocol (TCP/IP), remote direct memory access (ROMA), RDMA over Converged Ethernet (RoCE), Fibre Channel, InfiniBand (IB), iWARP, NVMe-over-fabrics (NVMe oF), and/or the like, or any combination thereof.

As another example, if a host SoC is located in the same package as the gateway die 302 (and/or one or more dies that may be connected to the first interface 304), the second interface 306 may be implemented with a die interface such as UCIe, AIB, BOW, OpenHBI, and/or the like.

The control logic 308 may control one or more operations of the gateway die 302, for example, as follows. The gateway die 302 may receive, using the first interface 304, first information 310 for a compute operation by a PIM device. The gateway die 302 may generate, based on the first information, second information 312 for the compute operation. The gateway die 302 may send, using the second interface 306, the second information 312, for example, to a compute node die and/or compute node.

Although the gateway die 302 illustrated in FIG. 3 is not limited to any specific applications, configurations, and/or the like, in some embodiments, the first information 310 may include one or more operands (e.g., matrices, vectors, scalars, and/or portions thereof), commands, parameters, and/or the like for one or more compute operations (e.g. a matrix multiplication). The control logic 308 may use the first information 310 to generate the second information 312 that may be sent, for example, to one or more compute nodes (e.g., using a compute node die) to distribute one or more operands, or portions thereof, to the one or more compute dies and/or compute nodes. In some embodiments, the second information 312 may also include one or more commands (e.g., using one or more command packets), activations, and/or the like to cause the one or more compute nodes to perform the one or more compute operations, or portions thereof.

In some embodiments, the gateway die 302 may include one or more additional interfaces, for example, a third interface that may be used to communicate with one or more compute nodes or groups thereof. For example, in some embodiments in which one or more compute nodes may be arranged in a configuration in which information may flow in a loop (e.g., a chain, ring, and/or the like), the gateway die 302 may receive third information (e.g., a result, completion, and/or the like), from one or more compute operations performed by the one or more compute nodes. As another example, in some embodiments, the gateway die 302 may use the first interface 304 and a third interface to send second information to two different groups of one or more compute nodes connected to the two different interfaces (e.g., in configuration such as a tree, star, and/or the like). In some embodiments, the gateway die 302 may receive third information (e.g., one or more results, completions, and/or the like), from one or more compute nodes using the same interface through which it sent the second information.

In some embodiments of dies, nodes, and/or the like, disclosed herein, an interface (and/or an associated interconnect) may be implemented with a first type of interface that, depending on the implementation details and/or context, may generally be characterized as being more suitable for communication between apparatus (e.g., dies) located within the same package (e.g., a die-to-die interface which, as mentioned above, may also be referred to as a die interface), or a second type of interface that, depending on the implementation details and/or context, may generally be characterized as being more suitable for communication between apparatus located in different packages, for example, between a die located in a package and a die or other apparatus located outside the package, for example, a die in another package, another assembly such as a circuit board, card, chassis, rack, server, datacenter, and/or the like. In some embodiments, and depending on the implementation details and/or context, such an interface (and/or corresponding interconnect) may be referred to as an off-package interface, a cross-package interface, a package-to-package interface, a SiP-to-SIP interface, a package interface, and/or the like (and/or corresponding interconnect).

In some embodiments, and depending on the implementation details and/or context, a package interface and/or associated interconnect may be implemented with one or more features such as: serial data lanes (e.g., using a serializer and/or deserializer (serdes) at one or more ends of an interconnect lane); differential data signaling (e.g., two conductors per interconnect lane of data); and/or an embedded clock (e.g., using a serializer and/or transmit driver circuit that may embed clock information in a serial data signal and a clock and data recovery (CDR) circuit that may implement a clock recovery scheme).

In some embodiments, and depending on the implementation details and/or context, a die interface and/or associated interconnect may be implemented with one or more features such as: parallel data lanes; single-ended data signaling (e.g., one conductor per interconnect lane of data referenced to a power supply, e.g., ground, potential); and/or a clock forwarding scheme (e.g., a source-synchronous clock).

In some embodiments of dies, nodes, and/or the like, disclosed herein, an interface may be implemented with a first type of interface that, depending on the implementation details and/or context, may generally be characterized as being more suitable for communication between a compute node die and one or more memory dies (e.g., DRAM dies, HBM dies, and/or the like), and which may be referred to as a memory interface, or a second type of interface that, depending on the implementation details and/or context, may generally be characterized as being more suitable for communication between a compute node die and another compute node die, gateway die, and/or the like, which may be referred to as a die-to-die interface which, as mentioned above, may also be referred to as a die interface.

In some embodiments, and depending on the implementation details and/or context, a memory interface and/or associated interconnect may be implemented with one or more features such as: a relatively large number of large number data lanes (e.g., 512 lanes with a DDR interface, or 1,000 or more (e.g., 1024) or 2,000 or more (e.g., 2048) lanes with an HBM interface); relatively low speed data lanes, for example, suitable for operating (e.g., directly) with DRAM dies; a relatively large number of independent channels (e.g., two 128-bit channels per die and eight channels for a total data bus width of 1024 bits in HBM, or 32 bits per channel and 16 channels for a total bus width of 512 bits in graphics DDR (GDDR)); and/or a relatively large die area and/or edge length occupancy per interface.

In some embodiments, and depending on the implementation details and/or context, a die interface and/or associated interconnect may be implemented with one or more features such as: a relatively low number of lanes per interface (e.g., a link width of 16, 32, 64, 128, or 256 data lanes in UCIe); one or more error correction features such as error detection, error correction, and/or retry at a physical and/or link layer; and/or a relatively small die area and/or edge length occupancy per interface.

For purposes of illustration, some example embodiments may be described below in the context of some example implementation details such as one or more compute nodes, compute node dies, gateway nodes, gateway dies, and/or the like, configured to use HBM-PIM devices (e.g., HBM-PIM devices with stacked memory dies and/or PIM dies), compute clusters configured with chained dies, specific interfaces such as HBM interfaces and/or UCIe interfaces, and/or the like. The principles disclosed herein, however, are not limited to these or any other implementation details.

Figure 4:
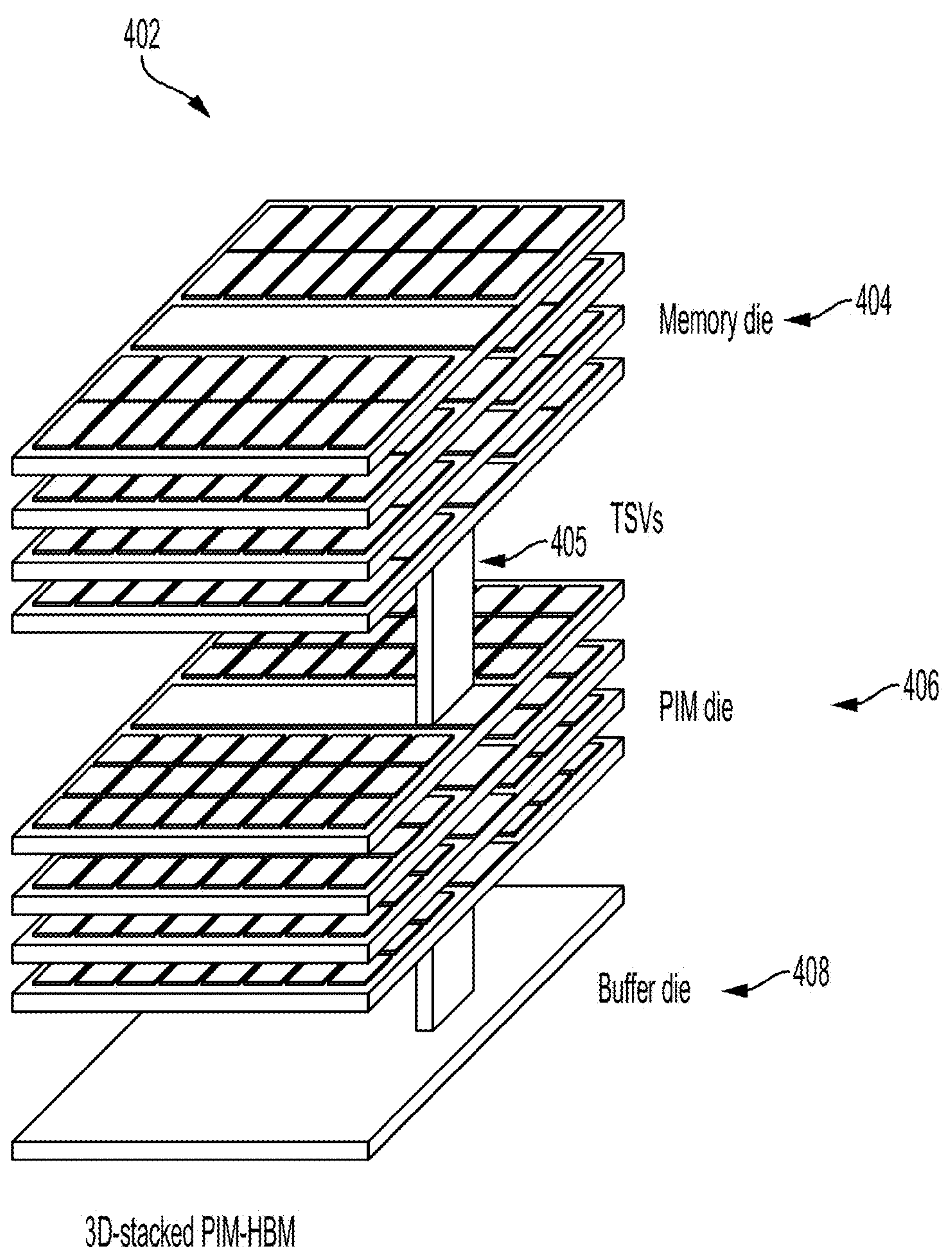
FIG. 4 illustrates a perspective view of an embodiment of a stacked processing in memory device in accordance with example embodiments of the disclosure.

FIG. 4 illustrates a perspective view of an embodiment of a stacked PIM device in accordance with example embodiments of the disclosure. The embodiment illustrated in FIG. 4 may be used, for example, to implement any of the PIM devices (e.g., PIM nodes) disclosed herein. The stacked PIM device 402 may be implemented, for example, with 3-dimensional (3D) packaging and may include one or more memory dies 404 (which may be implemented, for example, with HBM DRAM dies) stacked above a buffer die 408. The stacked PIM device 402 may also include one or more PIM dies 406 (which may be implemented, for example, with PIM-DRAM dies) stacked above the buffer die 408. A PIM die 406 may be implemented, for example, with a DRAM die having one or more compute elements fabricated on the DRAM die. One or more of the memory dies 404, PIM dies 406, and/or buffer die 408 may be connected using TSV 405.

In the embodiment illustrated in FIG. 4, the one or more PIM dies 406 may be stacked between the one or more memory dies 404 and the buffer die 408. In other embodiments, however, one or more PIM dies 406 may be interleaved with one or more memory dies 404. Additionally, or alternatively, one or more of the memory dies 404, PIM dies 406, and/or buffer die 408 may be stacked in different combinations, placed individually, on an interposer, substrate, and/or the like, any or all of which maybe located, for example, in package and connected using one or more die interconnects.

Figure 5:
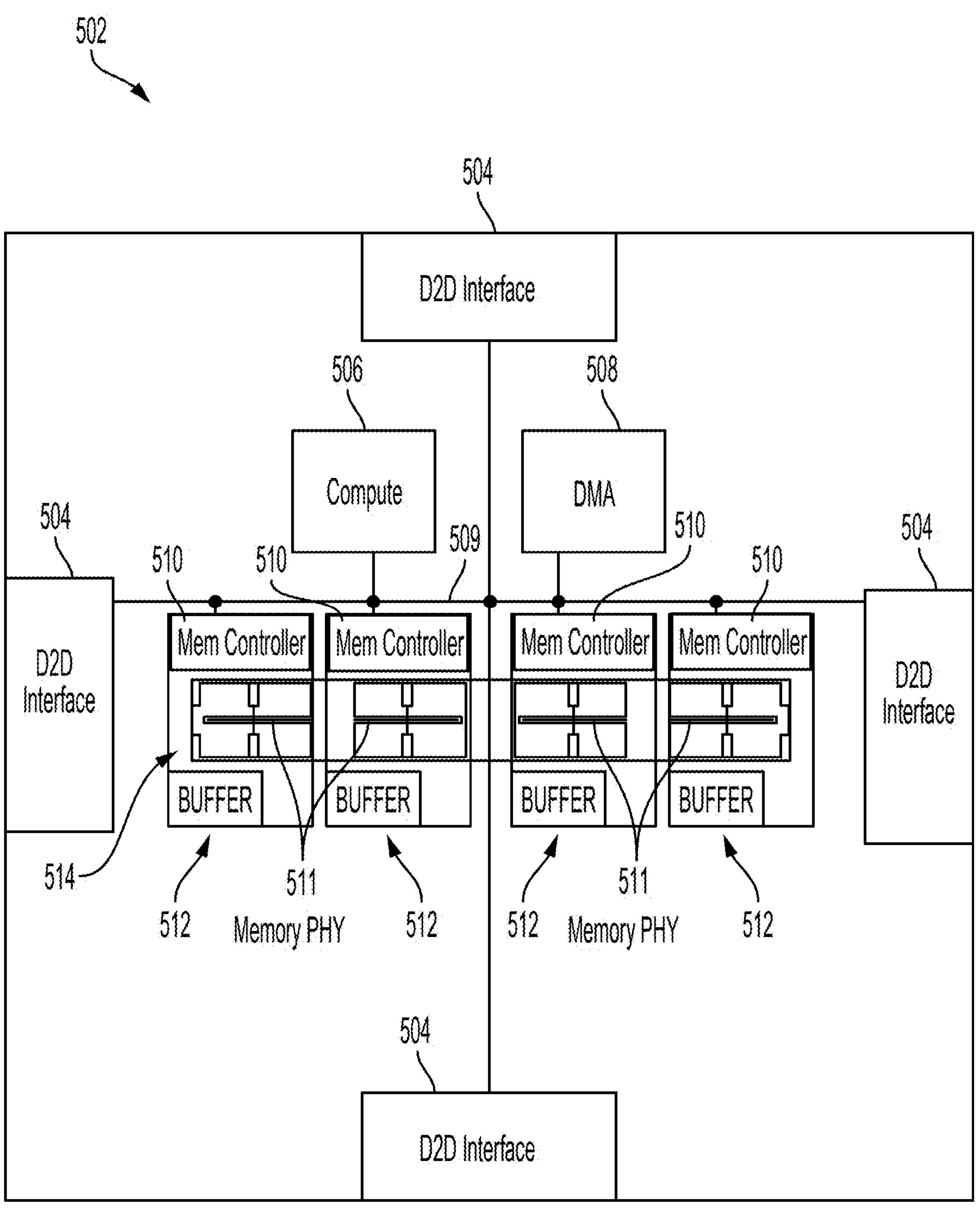
FIG. 5 illustrates a diagram of a first example embodiment of a compute node die in accordance with example embodiments of the disclosure.

FIG. 5 illustrates a diagram of a first example embodiment of a compute node die in accordance with example embodiments of the disclosure. The embodiment illustrated in FIG. 5 may be used, for example, to implement, or may be implemented with, any of the compute nodes, compute devices, compute node dies, and/or the like described herein.

The compute node die 502 illustrated in FIG. 5 may include one or more D2D interfaces 504, one or more compute elements 506, one or more memory controllers 510, one or more memory media 512, one or more landings 514, one or more memory access engines of direct memory access (DMA) engines 508, and one or more buses, interconnects, and/or the like 509 that may enable communications between any of the components located at the compute node die 502. The one or more D2D interfaces 504 may be implemented, for example, with UCIe, AIB, BOW, and/or the like. The one or more compute elements 506 may be implemented, for example, with one or more of a CPU, GPU, NPU, and/or the like. The one or more DMA engines 508 may enable one or more compute elements 506 and/or components external to the compute node die 502 to access any memory located at a compute node implemented with the compute node die 502.

The one or more landings 514 may be implemented, for example, with TSV landings or any other type of landing that may enable one or more memory dies, PIM dies, compute dies, and/or the like, to be stacked on, or in other ways connected to, the compute node die 502. The one or more landings 514 may include one or more memory layers 511, for example, one or more HBM PHY layer that may enable one or more DRAM dies to be stacked on a landings 514 and connected using one or more TSVs. The one or more memory controllers 510 may be implemented with any type of memory controller suitable for the type of memory connected to the one or more landings 514. For example, one or more memory controllers 510 may be implemented with one or more HBM controllers (HBMC) to control one or more HBM dies connected to the one or more landings 514. The one or more memory media 512 may be implemented, for example, with SRAM to operate as a buffer for memory operations, compute operations, and/or the like performed by the compute node die 502.

Although the embodiment illustrated in FIG. 5 is not limited to any specific application, in some example implementations, it may be used to implement a compute node that may be arranged in a chain configuration with one or more other compute nodes, gateway nodes, memory nodes, accelerator nodes, and/or the like, and thus, it may be referred to as a PIM chain element die which may also be referred to as a PCE die. In such an embodiment, the compute node die 502 may be connected (e.g., arranged in a chain, tree, star, ring, and/or the like) along with one or more other compute node dies 502 (one or more of which may be configured as a PCE die). Additionally, or alternatively, compute node die 502 connected to one or more gateway dies (e.g., as part of a gateway node), either directly or through another compute node. In some embodiments, a gateway die may manage one or more compute node dies 502. In such an embodiment, a gateway die may be referred to as a PIM chain gateway die which, as mentioned above, may also be referred to as a PCG die.

Figure 6:
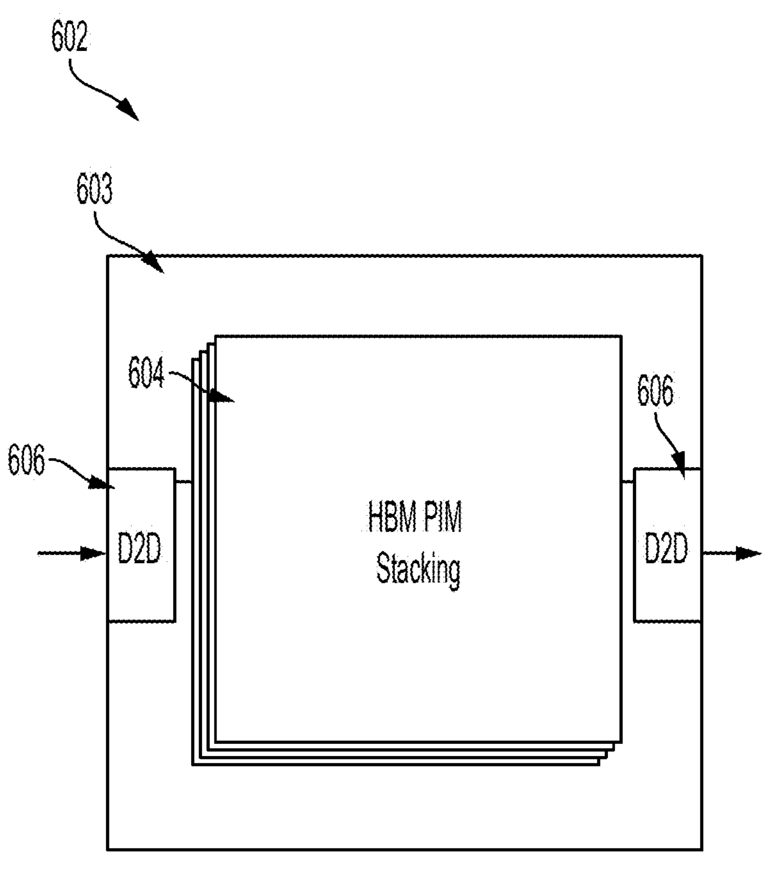
FIG. 6 illustrates a diagram of an example embodiment of a processing in memory node in accordance with example embodiments of the disclosure.

FIG. 6 illustrates a diagram of an example embodiment of a PIM node in accordance with example embodiments of the disclosure. The embodiment illustrated in FIG. 6 may be used, for example, to implement, or may be implemented with, any of the compute nodes, compute devices, compute node dies, and/or the like described herein. In some embodiments, and depending on the implementation details, the PIM node 602 illustrated in FIG. 6 may be used instead of a buffer die in an HBM-PIM device, for example, to implement a compute node that may communicate using another PIM device, memory device, gateway device, accelerator device, and/or the like, for a compute system in accordance with example embodiments of the disclosure.

The PIM node 602 illustrated in FIG. 6 may include a compute node die 603 having one or more D2D interfaces 606 and/or one or more HBM-PIM devices 604 stacked thereon. The one or more D2D interfaces 606 may be implemented, for example, with UCIe, AIB, BOW, and/or the like. The one or more HBM-PIM devices 604 may be implemented, using one or more memory dies and or PIM dies such one or more of a memory die 404 and/or a PIM die 406 illustrated with respect to FIG. 4. One or more of the D2D interfaces 606 may be used to connect the PIM node 602 to one or more other PIM nodes, gateway nodes, memory nodes, accelerator nodes, and/or the like, in any configuration such as a chain, tree, star, ring, and/or the like.

Figure 7:
FIG. 7 illustrates a diagram of a second example embodiment of a compute node die in accordance with example embodiments of the disclosure.
Figure 7:
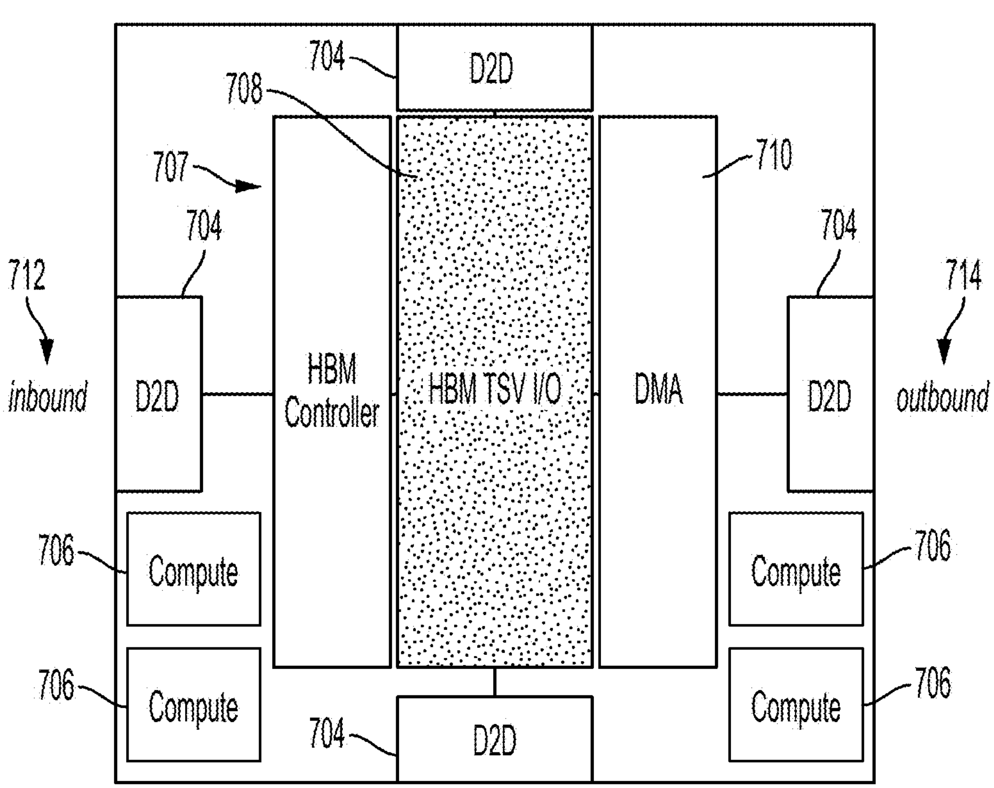

FIG. 7 illustrates a diagram of a second example embodiment of a compute node die in accordance with example embodiments of the disclosure. The embodiment illustrated in FIG. 7 may be used, for example, to implement, or may be implemented with, any of the compute nodes, compute devices, compute node dies, and/or the like described herein. The compute node die 702 illustrated in FIG. 7 may include one or more D2D interfaces 704, one or more memory controllers 707, one or more DMA engines 710, one or more compute elements 706, and/or one or more lands 708 that may implement one or more input and/or output (I/O or IO) connections (e.g., using one or more TSVs) for one or more stacked memory dies, PIM dies, and/or the like. The one or more D2D interfaces 704 may be implemented, for example, with UCIe, AIB, BOW, and/or the like. The one or more DMA engines 710 may enable one or more processing elements and/or components external to the compute node die 702 to access any memory located at a compute node implemented with the compute node die 702.

In some embodiments, one or more of the D2D interfaces 704 may implement one or more inbound connections 712, for example, to receive input data such as one or more matrices, vectors, scalars, or portions thereof, commands, command packets, and/or the like, for one or more compute operations performed at a compute node at which the compute node die 702 may be located. In some embodiments, one or more of the D2D interfaces 704 may implement one or more outbound connections 714, for example, to send data such as one or more matrices, vectors, scalars, or portions thereof, commands, command packets, and/or the like, for one or more compute operations at another compute node and/or compute node die. In some embodiments, a DMA Engine 710 enable one or more components of a compute node to access the memory (e.g., independently) of one or more compute elements at a compute node. In some embodiments, the one or more memory controllers 707 may include an HBM controller that may be adapted or optimized for power, latency, and/or bandwidth.

In some embodiments, one or more compute node dies 702 may be connected with one or more other PIM nodes, gateway nodes, memory nodes, accelerator nodes, and/or the like, in any configuration such as a chain, tree, star, ring, and/or the like, which, depending on the implementation details, may enable scaling of resources (e.g., memory, PIM, and/or the like) available to a host such as a processor or other user that may be connected to the compute node die 702.

In some embodiments, the compute node die 702 may include one or more compute elements 706 which may include one or more compute resources in addition to, or as an alternative to, one or more compute resources that may be implemented using the one or more lands 708 (e.g., compute resources in a stack of one or more PIM dies). For example, the one or more compute elements 706 may implement any type of compute functionality as mentioned above, may including, for example, matrix multiplication (e.g., GEMM), vector multiplication (e.g., GEMV), a math engine such as SoftMax, GELU, ReLU, sigmoid, and/or the like. In an embodiment having one or more compute resources implemented using the one or more lands 708 (e.g., one or more compute resources in a stack of one or more PIM dies), the one or more compute elements 706 may increase computational capabilities which may be beneficial, for example, if the one or more compute resources implemented using the one or more lands 708 do not have adequate computational power for a relatively complex task such as running a kernel, a relatively large language model, and/or the like. Additionally, or alternatively, the one or more compute elements 706 may increase computational capabilities to accommodate one or more functions, applications, and/or the like that may be implemented with an upgrade.

Figure 8:
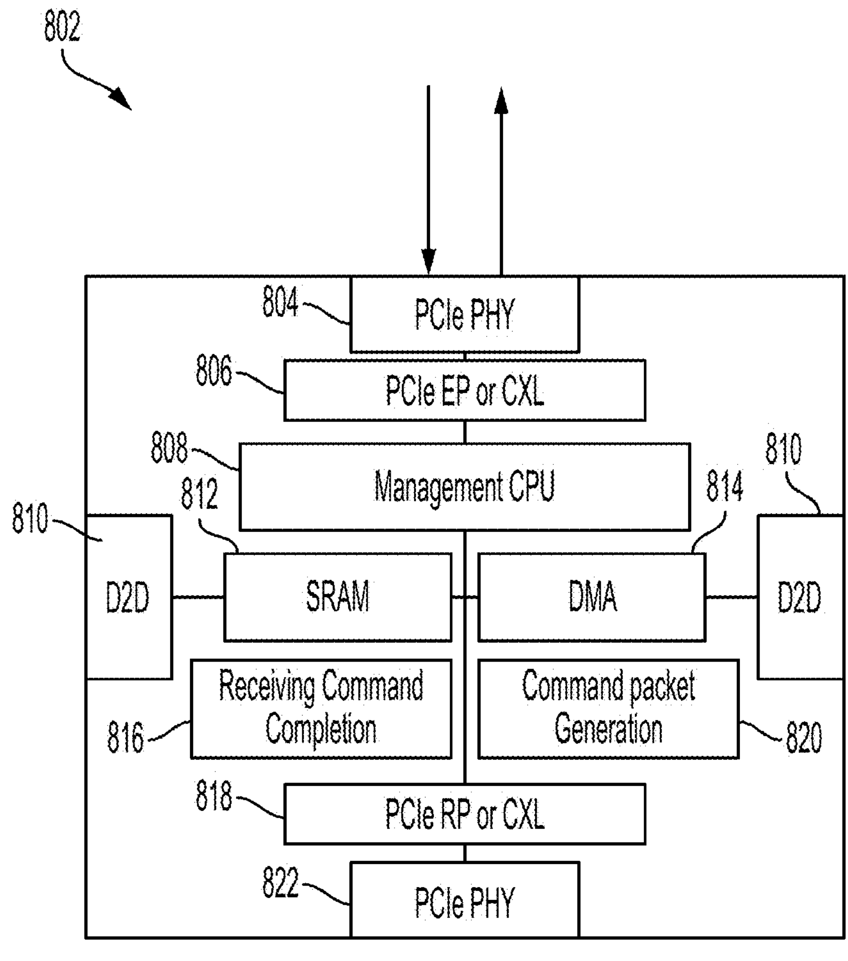
FIG. 8 illustrates a diagram of an example embodiment of a gateway die in accordance with example embodiments of the disclosure.

FIG. 8 illustrates a diagram of an example embodiment of a gateway die in accordance with example embodiments of the disclosure. The embodiment illustrated in FIG. 8 may be used, for example, to implement, or may be implemented with, any of the gateway nodes, gateway devices, gateway node dies, and/or the like described herein. The gateway die 802 illustrated in FIG. 8 may include one or more (e.g., multiples) of interconnect physical interfaces 804 and/or 822, protocol logic 806, management CPUs 808, D2D interfaces 810, memory media 812, DMA engines 814, receive command completion logic 816, protocol logic 818, and/or command packet generation logic 820. In some embodiments, the gateway die 802 may include functionality to implement PIM such as one or more PIM devices (e.g., stacks of dies including memory and/or compute elements, while in other embodiments, the gateway die 802 may only provide gateway functionality.

The interconnect physical interfaces 804 and/or 822 may be implemented, for example, with a communication interface (e.g., a package interface) such as PCIe, CXL, and/or the like. The protocol logic 806 may be used, for example, to implement a PCIe endpoint (EP), a CXL node, and/or the like. The protocol logic 818 may be used, for example, to implement a PCIe root point (RP), a CXL node, and/or the like. The memory media 812 may be implemented, for example, with SRAM to operate as a buffer for memory operations, compute operations, and/or the like performed by the gateway die 802. The management CPU 808 may be used to manage one or more nodes, devices, dies, and/or the like connected to the gateway die 802 using the one or more D2D interfaces 810, for example, in any configuration such as a chain, tree, star, ring, and/or the like.

Figure 9:
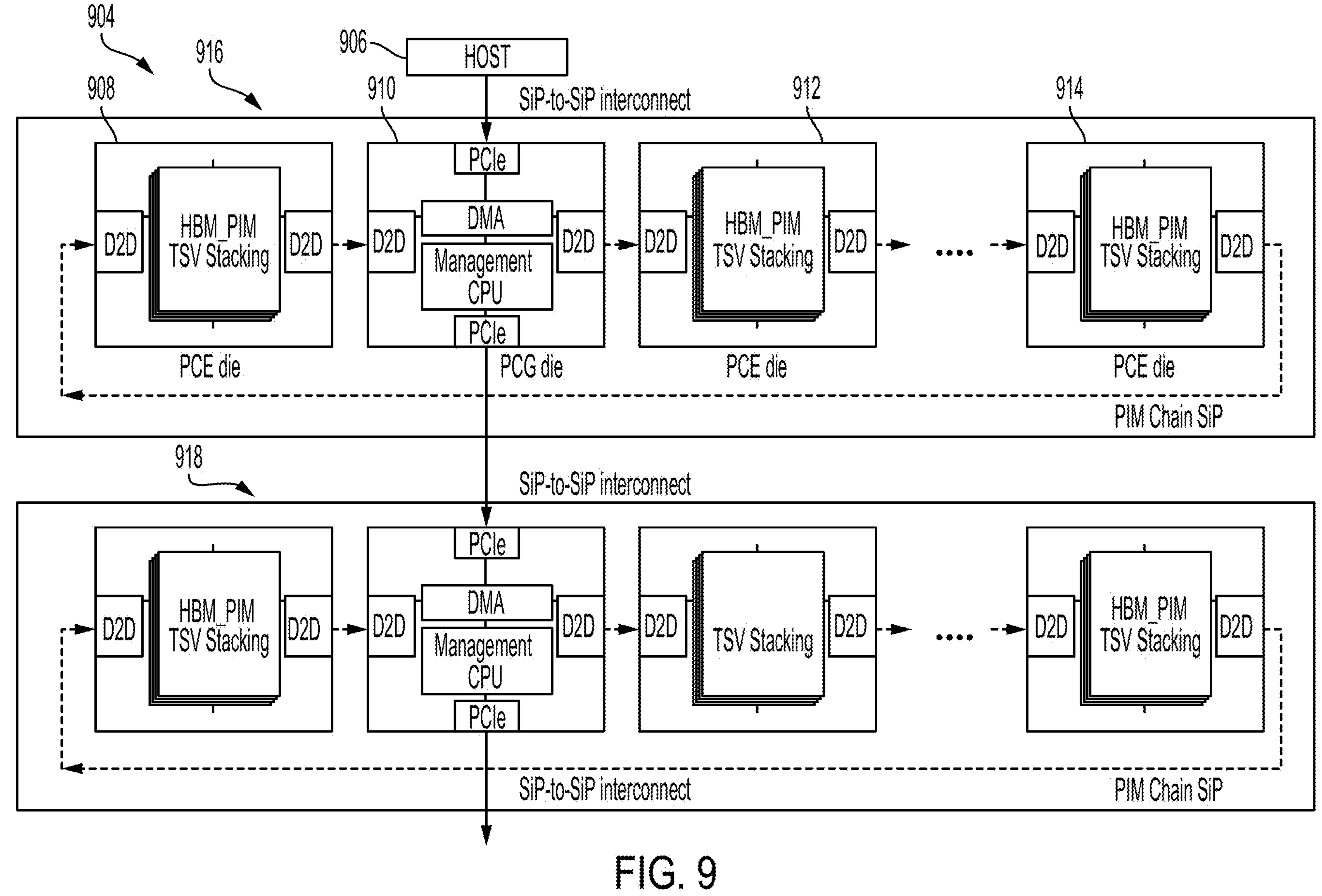
FIG. 9 illustrates a diagram of an embodiment of a processing in memory chain cluster, in accordance with example embodiments of the disclosure.

The command packet generation logic 820 may be used, for example, to generate one or more command packets to control one or more nodes, devices, dies, and/or the like connected to the gateway die 802 based, for example, on a command received from a host such as a processor or other user using one of the interconnect physical interfaces 804 and/or 822. The receive command completion logic 816 may be used, for example, to process one or more completions received from one or more nodes, devices, dies, and/or the like connected to the gateway die 802 using one or more of the D2D interfaces 810. For example, in some embodiments, the gateway die 802 may generate one or more command packets using the command packet generation logic 820, send the packets (e.g., using DMA engine 814 to one or more nodes, devices, dies, and/or the like using one or more of the D2D interfaces 810, for example, to compute node die 912 illustrated in FIG. 9. The one or more command packets may be processed (e.g., along a PCE chain as illustrated in FIG. 9) and return (e.g., as a command packet, a completion, and/or the like) using a D2D interface 810 to the receive command completion logic 816 and stored in SRAM 812.

Although the principles disclosed herein are not limited to any specific applications, in some embodiments, one or more aspects of the disclosure may be applied to artificial intelligence (AI) and/or machine learning (ML) schemes such as large language models (LLMs). Some LLM inferencing systems may be relatively expensive, consume relatively large amounts of power, use relatively large amounts of memory and/or memory bandwidth, and/or the like, to accommodate AI operations. Some AI and/or ML schemes, including LLM schemes, may operate using processors such as NPUs, GPUs, and/or the like, that may be connected to one or more (e.g., several) HBM-PIM devices using, for example, HBM interfaces that may consume relatively large amounts of area and/or edge length.

In some embodiments, one or more aspects of the disclosure may be used to implement one or more compute clusters (e.g., AI and/or ML compute clusters clusters) utilizing one or more compute nodes, gateway nodes, and/or the like in accordance with example embodiments of the disclosure. For example, some embodiments may of compute clusters may utilize one or more PIM devices that may communicate one or more additional devices such as a PIM device, gateway device, memory device, accelerator device, and/or the like. Moreover, aspects of the disclosure may combine HBM and PIM technologies which, depending on the implementation details, may enhance both memory bandwidth and computational efficiency by integrating processing units directly within the HBM modules. Depending on the implementation details, this integration may allow for parallel execution of computations on data stored in memory, which in turn may reduce or minimize data movement and/or offer performance benefits for memory-bound applications.

For example, in some embodiments, a PIM chain cluster may include a PCG die and one or more (e.g., N) PCE dies (where N may be any number, for example, 8 or 16, etc.). Moreover, in some embodiments, Multiple HBM-PIM modules may be stacked on one or more PCE dies. Depending on the implementation details, HBM devices including Processing in Memory (PIM) chained together may enable greater internal bandwidth. Additionally, or alternatively, some embodiments may implement compute resources at one or more PIM nodes (e.g., relatively lightweight compute resources) In some embodiments, HBM-PIM devices (or multiple HBM-PIM devices connected in networks such as chains, trees, stars, rings, and/or the like) may be connected to a GPU, NPU, and/or the like, SoC, using relatively lightweight (e.g., having relatively low die area, edge length, cost, power consumption and/or the like) die interfaces rather than relatively heavy (e.g., having relatively high die area, edge length, cost, power consumption and/or the like) HBM interfaces. However, in some embodiments, one or more compute nodes may use one or more HBM interfaces internally within a node to exploit the relatively high performance of HBM-PIM devices while reducing the amount of data transferred between nodes.

FIG. 9 illustrates a diagram of an embodiment of a PIM chain cluster, in accordance with example embodiments of the disclosure. The embodiment illustrated in FIG. 9 may be implemented with, or used to implement, any of the embodiments of compute nodes, gateway nodes, memory nodes, accelerator nodes, and/or the like, disclosed herein. For purposes of illustration, the embodiment illustrated in FIG. 9 may be described in the context of an LLM scheme, but the principles may be applied to any type of compute scheme. Moreover, the embodiment illustrated in FIG. 9 may be described in the context of some specific implementation details such as compute nodes connected in a chain configuration, PCIe interconnects, and/or the like, but other types of interconnects and/or node configurations such as stars, trees, and/or the like may be used.

The PIM chain cluster 904 illustrated in FIG. 9 may include a first PIM chain 916 which may be packaged in a first SiP. The PIM chain cluster 904 may include a second PIM chain 918 which may be packaged in a second SiP. The first PIM chain 916 may include one or more PCE dies 908, 912, . . . , 914, and a PCG die 910 arranged in a chain using D2D interconnects. The second PIM chain 918 may include one or more PCE dies arranged in a similar chain configuration. Any number of PCE dies and/or gateway dies may be used in each chain. The first PIM chain 916 may communicate with a host 906, for example, using a first SiP-to-SiP interconnect (e.g., using a PCIe interface at the PCG die 910). The second PIM chain 918 may communicate with the first PIM chain 916, for example, using a second SiP-to-SiP interconnect (e.g., using a second PCIe interface at the PCG die 910). In some embodiments, one or more additional PIM chains may communicate with the second PIM chain 918 using one or more additional SiP-to-SiP interconnects. In some embodiments, one or more of the PCE dies may communicate using D2D interfaces such as UCIe, AIB, BOW, and/or the like.

In some embodiments, the host 906 may generate and/or provide one or more datasets (e.g., AI and/or ML datasets) for training, inferencing, and/or the like, to one or more of the PCG dies 910. In some embodiments, the host 906 may communicate with one or more PCG dies, one or more PCE dies, and/or the like, in one or more of the PIM chains 916 and/or 918 in the PIM chain cluster 904.

In some embodiments, the host 906 may send LLM weight data via a PCIe EP or CXL connection to a PCG die 910 which may distribute the weight data to one or more PCEs in the chain corresponding PIM chain 916 and/or 918. Additionally, or alternatively, the host 906 may send one or more matrix multiplication commands to one or more PCG dies 910 which may use the one or more matrix multiplication commands to generate one or more command packets. The one or more PCG dies 910 may send the one or more command packets, for example, with one or more activations (e.g., operands) to the first PCE die 912. The first PCE die 912 may perform one or more distributed compute operations based on the command packet and forward a result of the compute operation(s) to the next PCE die 914. In some embodiments, the information sent between one or more PCG dies 910 and one or more PCE dies 908, 912, . . . , 914 may have the following format: {command_packet, activation v(12288), self-reduction result v(12288), completion_packet}. The information may be sent through one or more (e.g., each) PCE die in the PIM chain 916 until the PCG die 910 receives compute results from one or more (e.g., each) PCE die in the PIM chain 916, for example, with self-reduction and/or a completion packet. The second PIM chain 918 may perform a similar distributed, chained operation using one or more commands, input data, and/or the like, sent by the host 906 using the one or more SiP-to-SiP interconnects. The one or more PCG dies 910 at one or more (e.g., each) of the PIM chains 916, 918, . . . may send one or more results, completions, and/or the like to the host 906 using the one or more SiP-to-SiP interconnects. In some embodiments, one or more of the compute operations may be performed by one or more HBM-PIM die located at one or more of the PCE dies 908, 912, . . . , 914.

Figure 10:
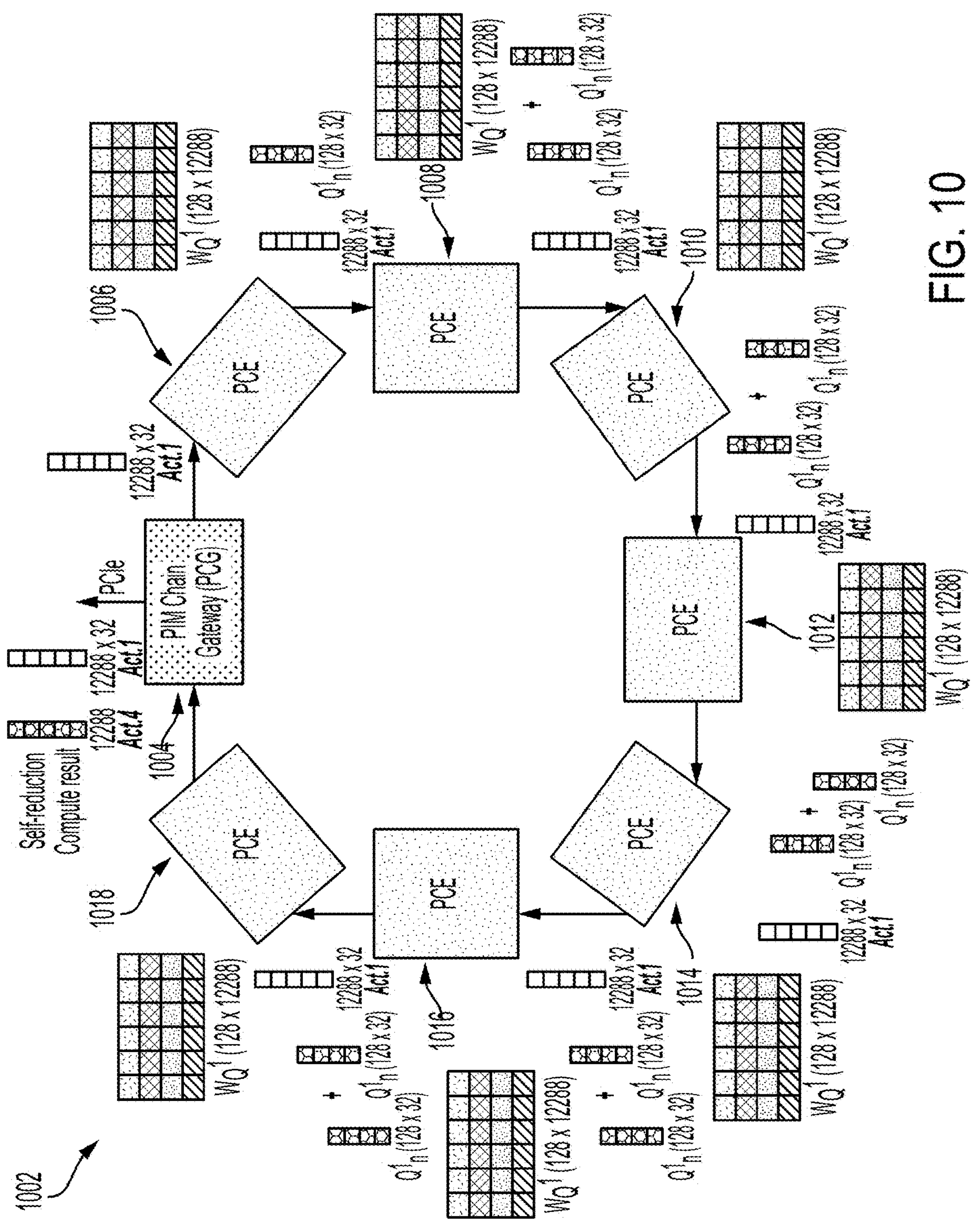
FIG. 10 illustrates a diagram of an example embodiment of a processing in memory chain cluster and an associated method in accordance with example embodiments of the disclosure.

FIG. 10 illustrates a diagram of an example embodiment of a PIM chain cluster and an associated method in accordance with example embodiments of the disclosure. The PIM chain cluster and associated method 1002 illustrated in FIG. 10 may be implemented with, or used to implement, any of the embodiments of compute nodes, gateway nodes, memory nodes, accelerator nodes, PIM chains, clusters, and/or the like, disclosed herein. Some models for LLM schemes may implement matrix multiplication operations which may consume relatively large amounts of resources such as memory capacity, memory bandwidth, compute bandwidth, and/or the like. In the embodiment illustrated in FIG. 10, a learning model for an LLM scheme may be loaded into one or more (e.g., each HBM) in one or more PCE dies PCE 1006 through PCE 1018. A PCG die 1004 may receive an activation vector or user query, indicated as Act.1. The PCG 1004 may send the activation vector (Act.1) to the chain of PCEs including PCE 1006-PCE 1018. The activation vector (Act.1) may be used, for example, for matrix multiplication within an HBM PIM device within PCE 1006. The HBM PIM device in PCE 1006 may perform an internal compute operation using the activation vector (Act.1). A result from the matrix multiplication in PCE 1006 may be provided to the next PCE indicated as PCE 1008. Q1n may indicate the result from matrix multiplication in PCE 1006. The computation result Qin and the activation vector (Act.1) may be forwarded to the next element in the chain indicated as PCE 1008.

PCE 1008 may perform another matrix multiplication using the activation vector and one or more rows of elements of the distributed weight matrix WQ1. PCE 1008 may generate another result Qin which may be added to the result of the previous chain element, PCE 1006. This procedure may continue in PCE 1010 through PCE 1018 where one or more (e.g., each) PCE may perform a matrix multiplication, provide a corresponding result, and add the corresponding result to a result of the previous chain elements. In some embodiments, a total or partial sum indicated as Act.4, and/or a completion indicating a completion of the chained matrix multiplication may be provided back to the PCG 1004.

In one example embodiment, the system may be initialized when a host sends LLM weight data to the PCG 1004, for example, using a PCIe connection. The PCG 1004 may distribute the weight data to the PCEs 1006-PCE 1018. The host may send a command to a perform matrix multiplication to the PCG 1004. The PCG 1004 may generate one or more command_packets and send it, for example, with an activation (e.g., an operand) to PCE 1006. The 1st PCE (1006) may perform distributed compute operation based on a command packet (e.g., "command_packet"), and forward, for example: {command_packet, activation v(12288), self-reduction result v(12288), completion_packet} to the next PCE (1008). When one or more (e.g., all) chain elements have performed corresponding matrix multiplications, the PCG 1004 may receive compute results from one or more (e.g., all) PCEs, for example, with self-reduction and/or a completion_packet.

Figure 11:
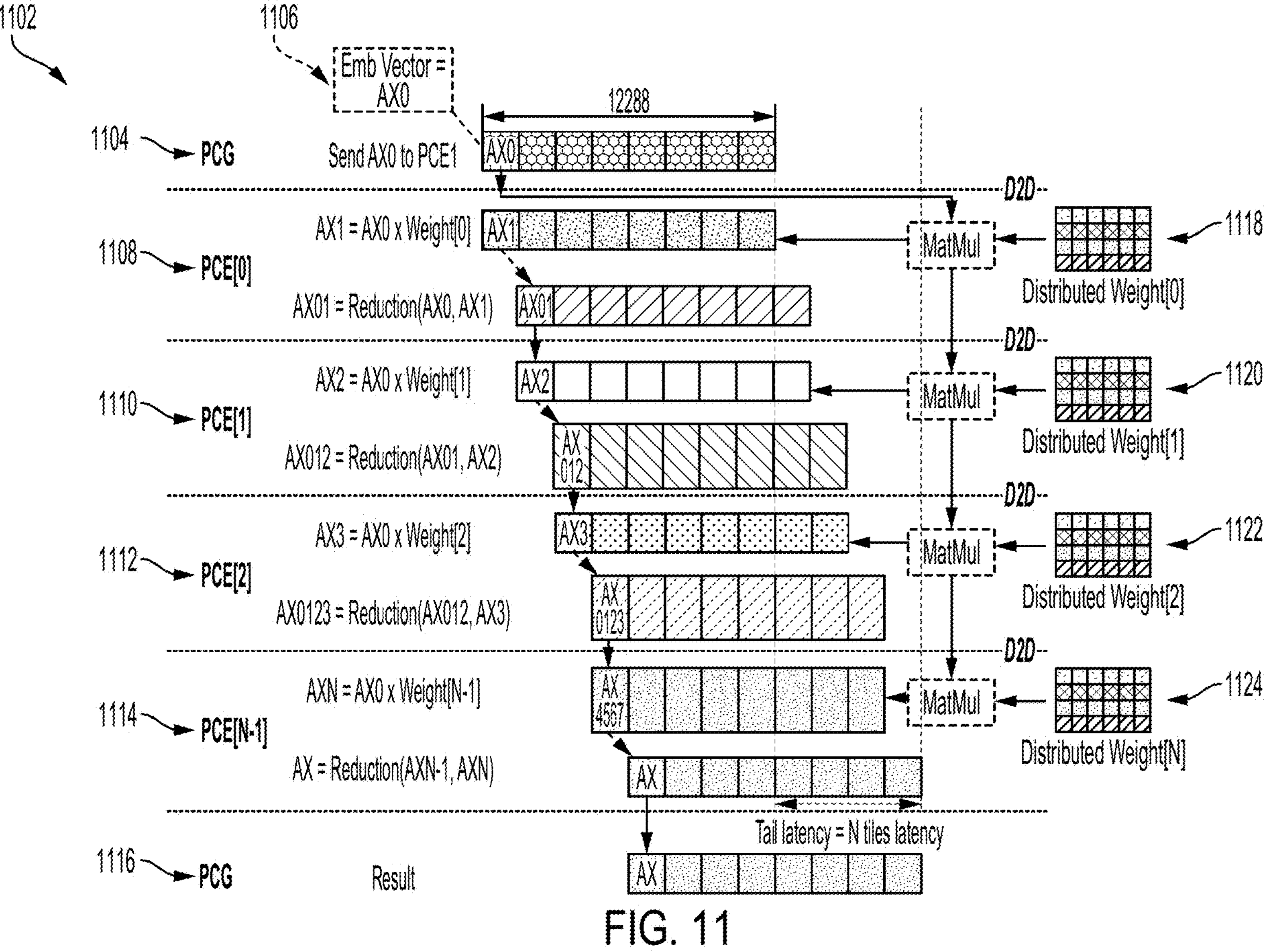
FIG. 11 illustrates a diagram of an example embodiment of a pipelined matrix multiplication reduction operation in accordance with example embodiments of the disclosure.

FIG. 11 illustrates a diagram of an example embodiment of a pipelined matrix multiplication reduction operation in accordance with example embodiments of the disclosure. The pipelined matrix multiplication reduction operation 1102 illustrated in FIG. 11 may be implemented with, or used to implement, any of the embodiments of compute nodes, gateway nodes, memory nodes, accelerator nodes, PIM chains, clusters, and/or the like, disclosed herein. In one exemplary embodiment, an activation vector 1106 may have 12K (e.g., 12288) elements. For example, one or more elements (e.g., each element) may include 2 bytes of floating point unit data. PCG 1104 may provide the activation vector 1106 to the first PCE such as PCE[0] 1108. One or more PCEs (e.g., each PCE), PCE[0] 1108 through PCE[N−1] 1114 may be correlated to the chain of PCEs such as PCE 1006 through PCE 1018. One or more (e.g., each) of PCE[0] 1108 through PCE[N−1] 1114 may act upon a different segment of rows of the distributed weight function, and perform matrix multiplication in a pipelined and/or parallel manner.

For example, activation vector 1106 may be provided by PCG 1104 to PCE[0] 1108 along with the first X number of rows of Distributed Weight [0] 1118. In some embodiments the rows may be broken up, for example, into 32, 64, or 128 segments. Any number of rows may be assigned each PCE, for example, in accordance with its relative processing power. When the first 128 rows of Distributed Weight [0] 1118 are provided to PCE[0] 1108 for matrix multiplication, the PCE[0] 1108 may perform matrix multiplication upon AX0 by AX1 and apply a reduction. This may cause the next layer of the pipeline, PCE[1] 1110 to receive AX01 which is may use to perform its own matrix multiplication. In the embodiment illustrated in FIG. 11, time may increase toward the right. PCE[1] 1110 may use the first column data received from 1108 to perform its own matrix multiplication. Thus, the multiplication may cascade down with one or more PCEs performing parallel matrix multiplications.

In some embodiments, one or more D2D interconnects may be used to perform a pipelined reduction. In some embodiments, a pipelined reduction may be performed on a tile basis. A tile may be sized, for example, based on an input element size for one or more tensor units for a GPU, NPU, and/or the like. For example, a tile may be 24×24 or 32×32. One or more column elements in 1104-1116 may each indicate a tile. In some embodiments, a flow control scheme may be based on a tile unit. In some embodiments, a hardware queuing mechanism may be used to implement inter-process communication message handling.

Figure 12:
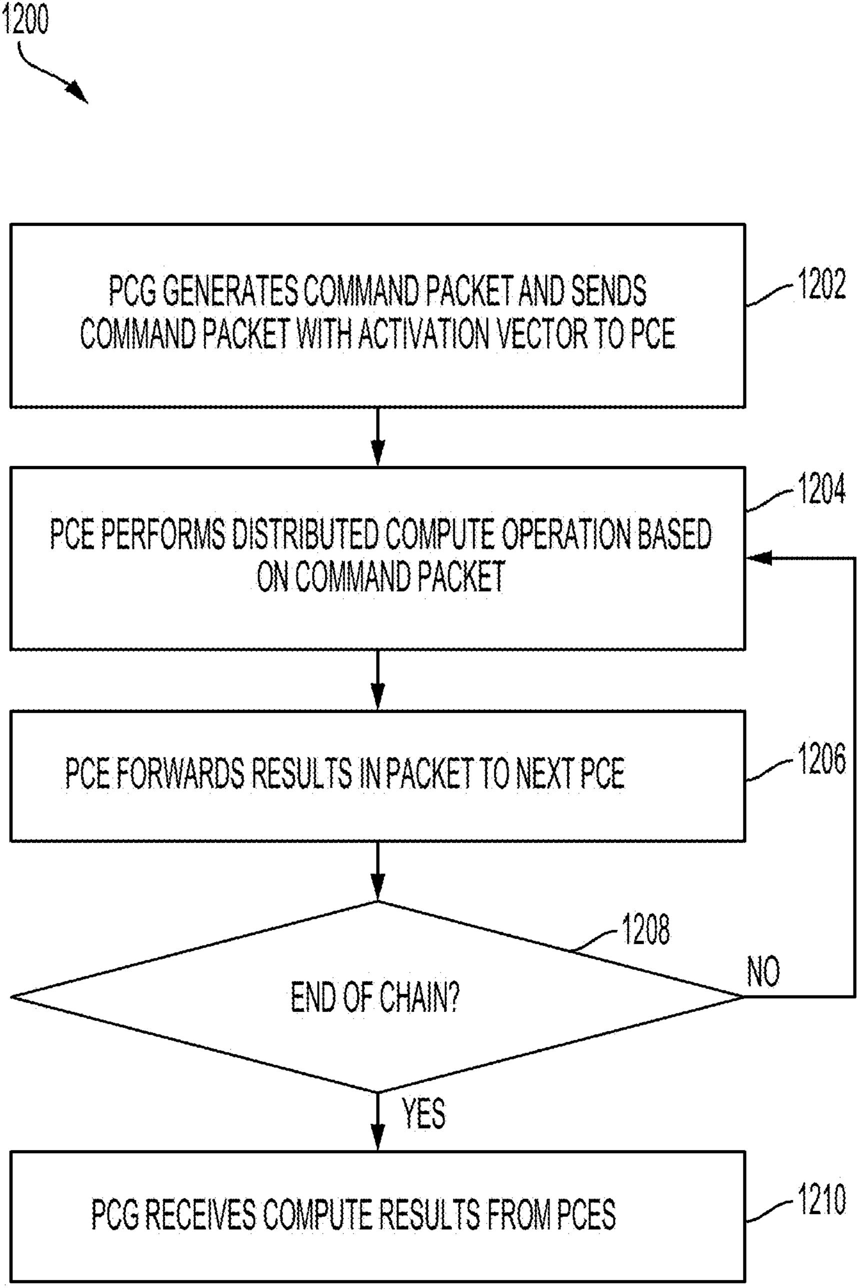
FIG. 12 illustrates a diagram of an embodiment of a method for performing a processing in memory chaining operation in accordance with example embodiments of the disclosure.

FIG. 12 illustrates a diagram of an embodiment 1200 of a method for performing a PIM chaining operation in accordance with example embodiments of the disclosure. Although the example method may illustrate a particular sequence of operations, in other embodiments, the sequence may be altered without departing from the scope of the present disclosure. For example, some of the operations depicted may be performed in parallel or in a different sequence that may not materially affect the function of the routine. In other examples, different components of an example device or system that implements the routine may perform functions at substantially the same time or in a specific sequence.

At operation 1202, a PCG may generate one or more command packets, and send the command packet with an activation vector to a first attached PCE in a chain.

At operation 1204, the first or subsequent PCE, may perform one or more distributed compute operations based on the command packet. In some embodiments, one or more compute operations may be performed all or in-part by one or more stacked HBM-PIM dies.

At operation 1206, the first or subsequent PCE may forward a result (e.g., in a packet) to the next PCE in the chain. The forwarded packet may include data such as the activation vector, a self-reduction result, and a command packet. Example packets may include: {command_packet, activation v(12288), self-reduction result v(12288), completion_packet}.

At operation 1208, a PCE may detect if it is the end of a chain of PCEs. If the PCE chain has more PCEs the method may continue at operation 1204. When the PCE is the last PCE in the chain, the method may proceed to operation 1210.

At operation 1210, the PCG may receive compute results from one or more (e.g., all) of the PCEs in the chain (e.g., formatted as a final result). The compute results may include a self-reduction and/or one or more completion packets.

According to some embodiments, methods and apparatuses may include a first processing in memory (PIM) chain gateway (PCG) die connected to a first and a second PIM chain element (PCE) die, where the first and second PCE die have a high bandwidth memory (HBM). In some embodiments, the PCG may connect to the first PCE die and last PCE die of a PIM chain compute cluster.

The PCG may further include a management central processing unit (CPU), and a DMA (direct memory access). The PCG, in some embodiments, may further include a connection interface, connecting to a PCE, and a host interface connecting to a second PCG die. The connection interface may be a universal chiplet interconnect express (UCIe). The host interface may be a peripheral component interconnect express (PCIe) or compute express link (CXL) interface in some embodiments. The PCE die further may include an HBM controller, and an HBM through silicon via (TSV) input/output (I/O) landing. The PCE die further may include a direct memory access (DMA) engine, and a connection interface configured to connect to other PCEs. The PCG may further include a connection interface, connecting to a PCE, and a host interface connecting to a host device. In some embodiments, the PCG may include multiple connection interfaces, connecting to multiple PCEs. The host interface may connect to one or more host CPUs, or a system and/or a host interface connecting to the next PCE on the other PIM chain cluster, in some embodiments.

The device may also include a PCG circuit configured to communicate with a first PCE circuit including an HBM. In some embodiments, the PCG may be configured to send a command packet to the first PCE. The command packet may contain an activation vector. The first PCE may be configured to perform a compute operation based on the command packet. The first PCE may further be configured to generate a result based on performing the compute operation, and forward the result to a second PCE connected to the first PCE. The first PCE and second PCE may be configured to perform compute operations in parallel in a pipeline fashion. In some embodiments, there may be multiple PCEs within a PIM chain cluster. The compute operations may include matrix multiplications using a distributed weight matrix.

Some embodiments may include a chain of PCEs comprising a HBM controller, a processor and a direct memory engine. The memory may include a PCG configured to send commands to the chain of PCEs.

In some embodiments, the PCEs may be configured to perform a compute operation by themselves, or by utilizing the stacked HBM-PIM modules, based on a distributed weight matrix. The PCEs may further be configured to perform a matrix multiplication based on the distributed weight matrix and an activation vector received from the PCG, in some embodiments. The PCEs may be further configured to perform the compute operations in parallel. The PCEs, in other embodiments may be configured to provide a result from one PCE in the chain of PCEs to the next PCE in the chain of PCEs.

Any of the functionality described herein, including any of control logic, compute elements, interfaces, and/or the like may be implemented with hardware, software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like and/or any combination thereof, CPLDs, FPGAs, ASICs, CPUs, GPUs, NPUs, TPUs, DPUs, and/or the like, executing instructions stored in any type of memory. In some embodiments, one or more components may be implemented as one or more SOCs, SIPs, and/or the like.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

In some embodiments, a portion of an element may refer to less than, or all of, the element. A first portion of an element and a second portion of the element may refer to the same portions of the element. A first portion of an element and a second portion of the element may overlap (e.g., a portion of the first portion may be the same as a portion of the second portion).

Since the inventive principles of this patent disclosure may be modified in arrangement and detail without departing from the inventive concepts, such changes and modifications are considered to fall within the scope of the following claims.

The invention claimed is:

1. An apparatus comprising:

a first device comprising at least one first die comprising:
- a first die-to-die interface configured to receive first information and second information;
- a first high-bandwidth-memory interface configured to receive the first information from the first die-to-die interface;
- a first compute element configured to perform, using the first information, a first compute operation; and
- a second die-to-die interface configured to send the second information;

a second device comprising at least one second die comprising:
- a third die-to-die interface configured to receive the second information from the second die-to-die interface;
- a second high-bandwidth memory interface configured to receive the second information from the third die-to-die interface; and
- a second compute element configured to perform, using the second information, a second compute operation.

2. A method comprising:

receiving, at a first device, using a first die-to-die interface, first information and second information, wherein the first device comprises a first high-bandwidth-memory interface coupled to the first die-to-die interface, a second die-to-die interface, and a first compute element;

storing, using the first high-bandwidth-memory interface, the first information;

sending, from the first device, using the second die-to-die interface, to a second device, the second information, wherein the second device comprises a third die-to-die interface configured to receive the second information, a second high-bandwidth-memory interface, and a second compute element;

storing, using the second high-bandwidth-memory interface, the second information;

performing, using the first information and the first compute element, a first compute operation; and performing, using the second information and the second compute element, a second compute operation.

3. The method of claim 2, further comprising:

sending, using the second die-to-die interface and the third die-to-die interface, from first device to second device, a result of the first compute operation;

wherein the second compute operation is performed using the result of the first compute operation.

4. The method of claim 2, wherein:

the first compute operation comprises a first matrix operation; and the second compute operation comprises a second matrix operation.

5. The apparatus of claim 1, wherein:

the second die-to-die interface is configured to send a result of the first compute operation to the third die-to-die interface; and the second compute element is configured to use the result of the first compute operation as an input to the second compute operation.

6. The apparatus of claim 1, wherein:

the first compute operation comprises a first portion of a mathematical operation; and the second compute operation comprises a second portion of the mathematical operation.

7. The apparatus of claim 1, wherein:

the first information comprises one or more first weights; and the second information comprises one or more second weights.

8. The apparatus of claim 1, wherein:

the first compute operation comprises a first matrix multiplication; and the second compute operation comprises a second matrix multiplication.

9. The apparatus of claim 1, wherein:

the first compute element is configured to perform a first reduction operation on a result of the first compute operation; and the second compute element is configured to perform a second reduction operation on a result of the second compute operation.

10. The apparatus of claim 1, wherein the at least one second die comprises a fourth die-to-die interface configured to send third information received through the first die-to-die interface, the second die-to-die interface, and the third die-to-die interface, the apparatus further comprising at least one third die comprising:

a fifth die-to-die interface configured to receive the third information from the fourth die-to-die interface;

a third high-bandwidth memory interface configured to receive the third information from the fifth die-to-die interface; and a third compute element configured to perform, using the third information, a third compute operation.

11. The apparatus of claim 1, further comprising a third device comprising at least one third die comprising:

a fifth die-to-die interface configured to receive information from a host;

a sixth die-to-die interface connected to the first die-to-die interface; and at least one control circuit configured to:

generate, based on the information, a command packet; and send, using the sixth die-to-die interface, to the first device, the command packet.

12. The apparatus of claim 11, wherein:

the information is first information;

the at least one third die comprises a seventh die-to-die interface; and the at least one control circuit is configured to:

receive, using the seventh die-to-die interface, a completion; and send, using the fifth die-to-die interface, based on the completion, second information to the host.

13. The apparatus of claim 11, wherein:

the at least one third die comprises a seventh die-to-die interface; and the at least one control circuit is configured to:

receive, using the seventh die-to-die interface, a result based on the first compute operation and the second compute operation; and send, using the fifth die-to-die interface, the result to the host.

14. An apparatus comprising:

a first device comprising at least one first die comprising:

a first die-to-die interface configured to receive a first operand for a first compute operation;

a first high-bandwidth-memory interface configured to store information for the first compute operation;

a first compute element configured to perform, using the first operand, the first compute operation; and a second die-to-die interface configured to send a result of the first compute operation;

a second device comprising at least one second die comprising:

a third die-to-die interface configured to receive the result of the first compute operation;

a second high-bandwidth memory interface connected to store information for a second compute operation; and a second compute element configured to perform, using the result of the first compute operation as a second operand, a second compute operation.

15. The apparatus of claim 14, wherein:

the first compute operation comprises a matrix multiplication; and the second compute operation comprises an addition operation.

16. The apparatus of claim 14, wherein the at least one first die is configured to perform a reduction operation on the result of the first compute operation to generate a reduced result.

17. The apparatus of claim 16, wherein the at least one second die is configured to perform, using the reduced result, a matrix multiplication.

18. The apparatus of claim 17, wherein:

the reduction operation is a first reduction operation; and the at least one second die is configured to perform a second reduction operation on a result of the matrix multiplication.

19. The apparatus of claim 14, wherein:

the information for the first compute operation comprises a first weight; and the at least one second die is configured to store, using the second high-bandwidth memory interface, second weight for the second compute operation.

20. The apparatus of claim 14, wherein the first operand comprises an activation vector.

* * * * *